Jan. 13, 1953

C. A. WATTS 2,625,283

DISPENSING APPARATUS

Filed March 16, 1950

INVENTOR.
Charles A. Watts
BY
R. G. Story
ATTORNEY

Jan. 13, 1953 C. A. WATTS 2,625,283
DISPENSING APPARATUS
Filed March 16, 1950 2 SHEETS—SHEET 2

INVENTOR.
Charles A. Watts
BY R. G. Story
ATTORNEY

Patented Jan. 13, 1953

2,625,283

UNITED STATES PATENT OFFICE 2,625,283

DISPENSING APPARATUS

Charles A. Watts, La Grange, Ill., assignor to Swift & Company, Chicago, Ill., a corporation of Illinois Application March 16, 1950, Serial No. 150,016

7 Claims. (Cl. 214—310)

The present invention relates to apparatus for dispensing ice cream or the like from the container, such as a paper cup.

The principal object of the present invention is to provide retail establishments with apparatus by which the disadvantages attendant upon the hand-dipping of ice cream can be eliminated. A number of problems are involved. One is the time required for someone, such as a waitress, to fill a scoop of ice cream to the cone or dish, as the case may be. It might appear that the time involved in preparing each serving is quite short. However, over a given period, even as little as one day, the aggregate of the times for preparing all of the servings is substantial. Furthermore, if the ice cream is overly chilled, as often happens, the time for filling the scoop is greatly increased.

Another disadvantage involved in the hand-scooping of ice cream is the lack of uniformity of the various servings. In some instances the size of the serving will be small with the result that the vendor may lose the good-will of that customer. In other instances, servings may be too large, both because of errors in judgment and because of the compaction of ice cream at the time it is scooped, resulting in a lowering of the profit normally expected to be earned from a given volume of product. The present invention overcomes these problems and enables the rapid distribution of uniform servings of ice cream.

Additional objects and advantages include: a device which is low in first cost; a device which has a minimum of moving parts, thereby insuring that there is little to get out of order and that little maintenance is required; a device which may be operated by one hand, thereby leaving the other hand free to hold the cone or dish as the case may be; and a device which will warm the exterior of the cup to speed the dispensing process should the ice cream be excessively cold.

Further objects and advantages will become apparent from the following description taken in conjunction with the drawings in which.

Figures 1, 2:
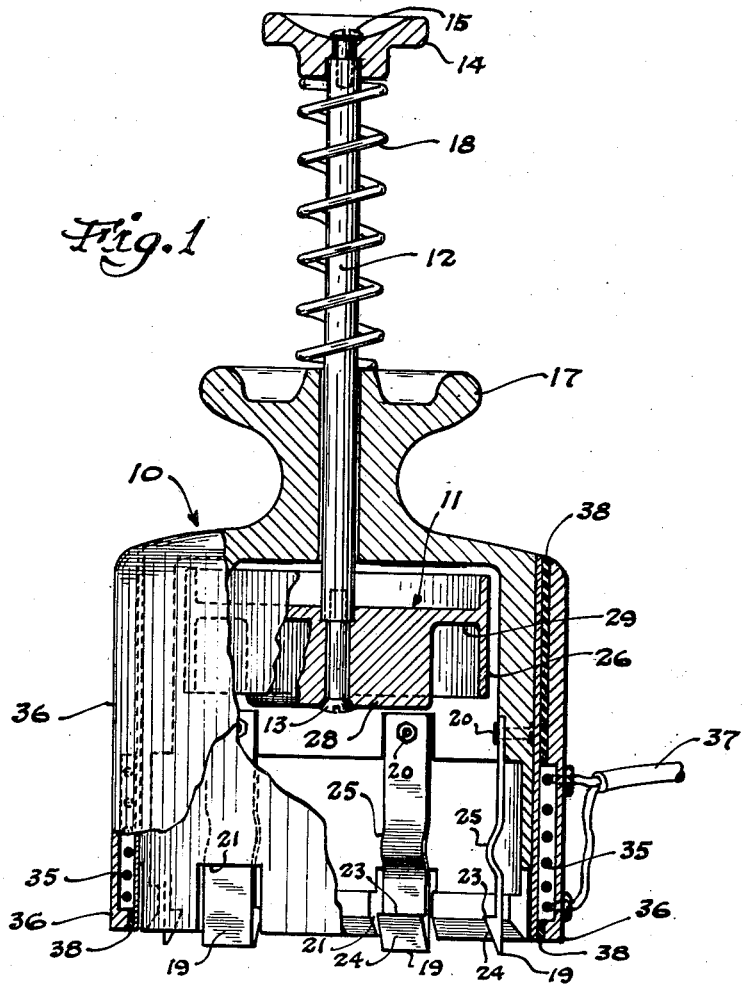
Fig. 1 is an elevational view of apparatus embodying the present invention with portions thereof cut away to better show the structure of the device.
Fig. 2 is a view of the apparatus of Fig. 1 which view is taken looking into the bottom opening thereof.
Figure 3:
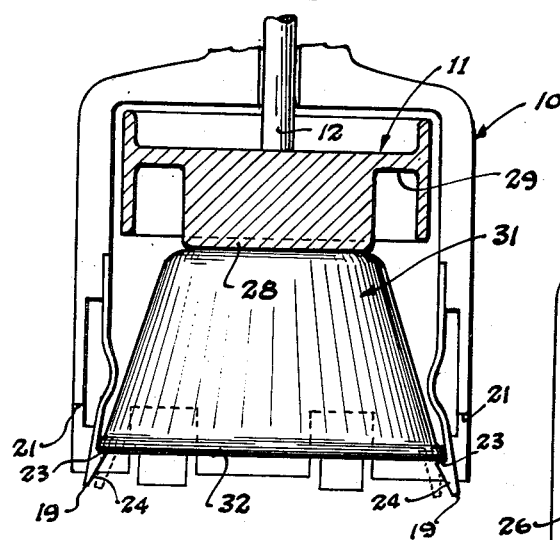
Figure 4:
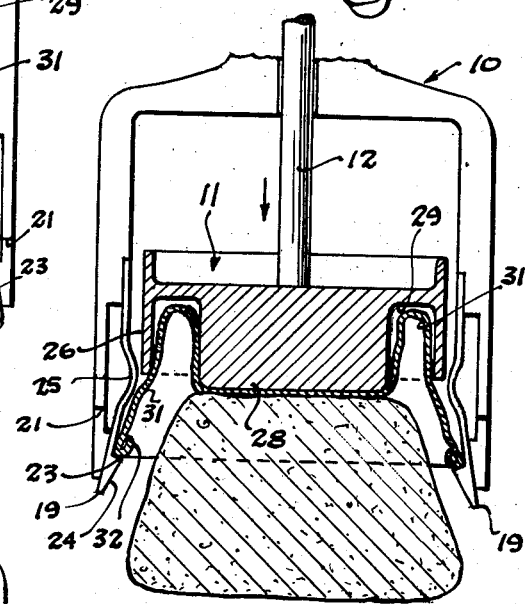
Figure 5:
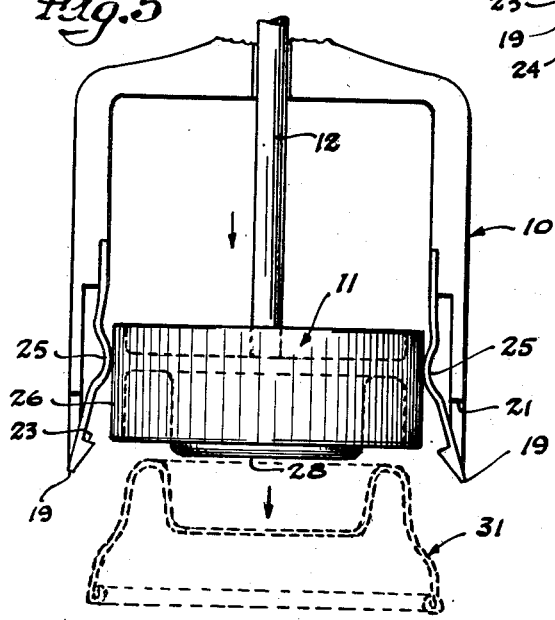

Figs. 3, 4, and 5 are diagrammatic sectional views of the apparatus of Fig. 1 illustrating successive stages in the use of the apparatus for removing ice cream from a paper cup.

In the structure illustrated an inverted cup-shaped holder, generally 10, forms the body of the dispensing device. Within the holder is a plunger 11 movable up and down by means of a rod 12 to which the plunger 11 is attached by a screw 13. A cap 14 is attached to the external end of rod 12 by a screw 15.

The upper portion of holder 10 is mushroomed out to form a finger grip means as indicated by 17. A spring 18 bears upon an upper shoulder of the body 10 and also on a lower shoulder of the cap 14 thus serving to bias the plunger upwardly in a retracted position. By grasping the finger grip 17 with the fingers of one hand while, at the same time, placing the thumb of the same hand on cap 14, the spring 18 may be compressed and plunger 11 extended.

Projecting downwardly from holder 10 are a plurality of hook-shaped fingers 19 to retain the paper cup within the holder 10 while the plunger extracts the ice cream from the cup. The upper ends of the fingers 19 are attached to the holder as by means of small bolts or rivets 20. The fingers 19 are formed of a spring material so that whenever they are displaced from the normal position illustrated in Fig. 1, the spring action of the material will urge the fingers to the normal position. In the illustrated embodiment the outer periphery of holder 10 is cut away as indicated at 21 to allow the fingers to be moved outwardly during the insertion and removal of a cup, as will subsequently be apparent.

The hook adjacent the end of each finger forms a ledge 23 against which the rim of the cup bears as the ice cream is removed from the cup. Between the ledge 23 and the lower end of the finger 19 is a tapered surface 24 which acts as a cam to move the finger 19 outwardly as the filled cup of ice cream is inserted within the holder 10. Intermediate of the ends of finger 19 the finger is bowed inwardly, as indicated at 25, which bow is adapted to cooperate with the periphery 26 of plunger 11 to move the fingers 19 outwardly as plunger 11 approaches the end of its stroke, at which time the movement of the fingers releases the paper cup from the holder for disposal.

Between the outer wall 26 of plunger 11 and a central abutment 28 is recess 29 to receive the sides of the cup as the ice cream is pushed from the cup. The diameter of the bottom face of abutment 28 is substantially equal to the base diameter of the paper cup to be used. This is of particular importance in permitting an even application of force against that portion of the ice cream while, at the same time, not interfering with the action of the dispenser in skinning the cup from the ice cream. In some embodiments the abutment might be larger but in such cases greater control of the exact structure and fabrication of the cups is required.

In the illustrated embodiment the bottom edge of periphery 26 is slightly above the bottom face of abutment 28 to insure that the ice cream is fully released from the cup before the fingers 19 are cammed outwardly to free the cup for disposal.

In using the present invention a plurality of paper cups, generally 31, are filled with a fluid ice cream which is then hardened in the cup by chilling. The cups are formed of a paper stock having sufficient rigidity to withstand the handling which occurs, yet sufficiently soft to be readily deformable upon the application of only a nominal force applied during the extraction process.

The configuration of the cups is such that they taper outwardly from the base to the mouth thereof, having the general appearance of an inverted frustum of a cone. Preferably, the rim 32 is reinforced as by means of rolling the edge when the cup is formed. Such reinforcement is desirable so that the cup body and not the rim per se will be deformed after the rim is hooked by spaced fingers 19 and as force is being applied by the plunger 11 to skin the cup from the ice cream.

After the cups 31 which have been filled with ice cream and chilled are delivered to the place of sale, they are stacked in a suitable cooled container in an inverted position, i. e., with the mouth of the cup downwardly and the base up. When the ice cream is to be dispensed the holder 10 is slipped downwardly over the uppermost cup 31 in such a stack so that the cup slips within the mouth of the holder. As the sides and rim of the cup 31 encounter fingers 19 the cam surfaces 24 at the lower end of the fingers push the fingers outwardly into recess 21, allowing the cup to slide entirely within the holder, and ledges 23 to hook under a rim 32 of the cup, as illustrated in Fig. 3.

By lifting upwardly on the holder the top cup will be removed from the stack and may be held over any suitable receptacle, such as a dish or a cone, into which the ice cream is to be placed. Plunger 11 is then depressed with abutment 28 pushing the ice cream downwardly away from holder 10 and cup 31. The sides of the cup 31, being held against downward movement by the action of rim 32 hooked over fingers 19, are bowed out and skinned back away from the ice cream, and roll upwardly into recess 29, as illustrated in Fig. 4. Because of the tapered sides to the cup 31 and the corresponding tapered configuration of the ice cream within the cup, the ice cream is soon released from the cup and is delivered into the receptacle.

After abutment 28 of plunger 11 has descended sufficiently far to insure that the ice cream will at all times be removed from the cup, the periphery 26 of plunger 11 contacts the bow 25 in fingers 19 to bend the fingers outwardly, as illustrated in Fig. 5. This action releases the rim 32 from under abutment 23 of the fingers and the continued outwardly movement of plunger 11 pushes the cup 31 from holder 10. This will be done after the holder is moved to over a waste basket so that the cup will be dropped therein. Spring 18 may then be allowed to return the plunger 11 to the retracted, initial position. The dispensing apparatus is then ready to be slipped over the top of the next filled cup in the stack to dispense the subsequent serving of ice cream.

In certain instances an excessive adhesion may occur between cup 31 and the ice cream filling causing difficulty in extracting the ice cream from the cup. This may be particularly true when the ice cream is excessively chilled at the time it is sought to be dispensed. To overcome this difficulty a heating element 35 is placed within a jacket 36 surrounding the area occupied by the filled cup 31 when it is inserted into the holder. An electrical cord 37 is connected to a suitable source of electric current. Preferably, the recess within which the heating element 35 is received is sealed, as by means of gaskets 38, so that the dispenser may be washed without injuring the electrical circuits. The heat produced by this element radiates from the inner walls of the holder 10 and is sufficient to almost instantaneously remove the excess chill from the surface of cup 31 as it is placed in the holder so that the cup is readily stripped from the ice cream as the plunger 11 is depressed.

The foregoing description of a specific embodiment is for the purpose of complying with Section 4888 of the Revised Statutes and should not be construed as imposing unnecessary limitations upon the appended claims. It will be apparent that certain modifications may be made without departing from the spirit of the invention.

For example, in some embodiments it may be desired to dispense with spring 18 which, in the illustrated device, is used to return plunger 11 to the retracted position. In such cases the plunger will stay in the extended position after the empty cup is released from the holder. The plunger remains at that point and as the holder 10 is placed over the next inverted cup to be emptied, a slight downward pressure on the holder after the cup bottoms against abutment 28 of plunger 11 will serve to both retract the plunger and to insert that cup into the holder.

I claim:

1. A device for removing the solidified contents, such as ice cream, from an open-top paper cup or the like, said device including a holder having a mouth communicating with an internal opening within which said cup may be received with the open end of the cup adjacent said mouth, means adjacent to the mouth of the holder to engage the rim of the open end of the cup at spaced points against forces tending to dislodge the cup from the casing, said means having a plurality of hook-shaped fingers attached to said holder and adjacent the mouth thereof, and to support a filled cup within the holder, and plunger means within the holder and operable from the exterior of the holder to push the bottom of the cup and contents toward said mouth.

2. A device for removing the solidified contents, such as ice cream, from a paper cup or the like, said device including an inverted cup-shaped holder within which an ice cream filled cup may be inserted in an inverted position, a plunger within the holder, plunger operating means projecting upwardly above the holder, said plunger and means being resiliently biased in a retracted position, finger grip means attached to and projecting above the holder adjacent to the plunger whereby the holder may be supported and the plunger depressed with one hand, and means adjacent the open end of the holder to engage the rim of said filled cup as the latter is inserted into the holder, and to support the cup within the holder while the contents are dislodged therefrom by the pressure of the plunger.

3. A device for removing the solidified contents, such as ice cream, from a paper cup or the like, said device including an inverted cup-shaped holder within which an ice cream filled cup may be inserted in an inverted position, a plunger within the holder, plunger operating means projecting upwardly above the holder, said plunger and means being resiliently biased in a retracted position, finger grip means attached to and projecting above the holder adjacent to the plunger whereby the holder may be supported and the plunger depressed with one hand, and retaining means adjacent the open end of the holder to engage the rim of said filled cup as the latter is inserted into the holder, said retaining means having a plurality of hook-shaped fingers attached to the holder adjacent the open end thereof, said fingers being resiliently urged toward the interior of the holder with the hooks of the fingers projecting inwardly to slip over the rim of a cup inserted into the casing to support the cup within the casing while the contents are dislodged therefrom by the pressure of the plunger.

4. A device for removing the solidified contents, such as ice cream, from a paper cup or the like, said device including an inverted cup-shaped holder within which an ice cream filled cup may be inserted in an inverted position, a plunger within the holder, plunger operating means projecting upwardly above the holder, said plunger and means being resiliently biased in a retracted position, finger grip means attached to and projecting above the holder adjacent to the plunger whereby the holder may be supported and the plunger depressed with one hand, and retaining means adjacent the open end of the holder to engage the rim of said filled cup as the latter is inserted into the holder, said retaining means having a plurality of hook-shaped fingers attached to the holder adjacent the open end thereof, said fingers being resiliently biased toward the interior of the holder with the hooks of the fingers projecting inwardly to slip over the rim of a cup inserted into the casing to support the cup within the casing while the contents are dislodged therefrom by the pressure of the plunger, said fingers being formed with the projecting ends thereof tapering away from the end of the hook to form a cam-like surface to urge the fingers in an outwardly direction as the cup is inserted there-between.

5. A device for removing the solidified contents, such as ice cream, from a paper cup or the like, said device including an inverted cup-shaped holder within which an ice cream filled cup may be inserted in an inverted position, a plunger within the holder, plunger operating means projecting upwardly above the holder, said plunger and means being resiliently biased in a retracted position, finger grip means attached to and projecting above the holder adjacent to the plunger whereby the holder may be supported and the plunger depressed with one hand, retaining means adjacent the open end of the holder to engage the rim of said filled cup as the latter is inserted into the holder, said retaining means having a plurality of hook-shaped fingers attached to the holder adjacent the open end thereof, said fingers being resiliently biased toward the interior of the holder with the hooks of the fingers projecting inwardly to slip over the rim of a cup inserted into the casing to support the cup within the casing while the contents are dislodged therefrom by the pressure of the plunger, and cam means to urge said fingers outwardly at the end of the plunger stroke, thereby to release the cup after the ice cream has been ejected therefrom.

6. A device for removing the solidified contents, such as ice cream, from a paper cup or the like, said device including a cup-shaped holder within which an ice cream filled cup may be inserted with the open top of the cup adjacent the mouth of the holder, a plunger within the holder movable along a line toward and away from said mouth with the face of the plunger toward said mouth, said face being of substantially the same configuration as the cross-sectional configuration of said cup but of a smaller size, plunger operating means outside the holder, and cup support means adjacent the mouth of the holder, said cup-support means including a plurality of hook-shaped fingers attached to the holder and adjacent the mouth thereof.

7. A device for removing the solidified contents, such as ice cream, from an open-top paper cup or the like, said device including a holder having a mouth communicating with an internal opening within which said cup may be received with the open end of the cup adjacent said mouth, means adjacent the mouth of the holder to engage the rim of the open end of the cup at spaced points against forces tending to dislodge the cup from the casing and to support a filled cup within the holder, said means including a plurality of hook-shaped fingers attached to the holder and adjacent the mouth thereof, plunger means within the holder and operable from the exterior of the holder to push the bottom of the cup and contents toward said mouth, and heat producing and radiating means about the periphery of the space occupied by the cup within the holder to warm the exterior of the cup to aid in separating it from the contents.

CHARLES A. WATTS.

REFERENCES CITED

The following references are of record in the file of this patent:

UNITED STATES PATENTS

| Number | Name | Date |
|---|---|---|
| 1,431,702 | Smend et al. | Oct. 10, 1922 |
| 1,579,612 | Hoffman et al. | Apr. 6, 1926 |
| 1,587,259 | Wadd et al. | June 1, 1926 |
| 1,597,950 | Baynes | Aug. 31, 1926 |
| 1,738,814 | Baynes | Dec. 10, 1929 |
| 1,740,386 | Baynes | Dec. 17, 1929 |
| 1,845,369 | Von Keller | Feb. 16, 1932 |